United States Patent [19]

Bennett et al.

[11] 4,317,277

[45] Mar. 2, 1982

[54] LOW RESISTANCE ELECTRIC JOINT BETWEEN CONDUCTIVE MEMBERS, AT LEAST ONE MEMBER HAVING AN INSULATION COATING THEREON, AND THE METHOD OF MAKING SUCH JOINT

[75] Inventors: Moreland P. Bennett, Hickory; Louis F. Ettlinger, Conover, both of N.C.

[73] Assignee: General Electric Company, Philadelphia, Pa.

[21] Appl. No.: 169,341

[22] Filed: Jul. 16, 1980

Related U.S. Application Data

[63] Continuation of Ser. No. 942,853, Sep. 15, 1978, abandoned, which is a continuation-in-part of Ser. No. 720,637, Sep. 7, 1976, abandoned.

[51] Int. Cl.³ .............................................. H01R 43/02
[52] U.S. Cl. ........................................ 29/860; 29/863; 174/94 R; 219/91.21; 219/93; 339/275 T
[58] Field of Search .................. 219/93, 92, 91.21, 94, 219/91.22; 174/94 R, 84 R, 84 L; 29/628, 860; 339/275 R, 275 T

[56] References Cited

U.S. PATENT DOCUMENTS

| 3,214,564 | 10/1965 | Katzer et al. ......................... 219/92 |
| 3,231,964 | 2/1966 | Bennett . | |
| 3,277,268 | 10/1966 | Williams ...................... 219/91.21 X |
| 3,333,771 | 8/1967 | Garscia ................................. 219/92 |
| 3,566,008 | 2/1971 | Ettlinger et al. . | |
| 3,592,993 | 7/1971 | Bennett . | |
| 3,715,705 | 2/1973 | Kuo . | |
| 3,758,703 | 9/1973 | Golden et al. . | |
| 3,814,836 | 6/1974 | Neale . | |

FOREIGN PATENT DOCUMENTS

| 1615841 | 8/1970 | Fed. Rep. of Germany .... 174/94 R |
| 46-23134 | 7/1971 | Japan ..................................... 219/92 |
| 6609162 | 1/1968 | Netherlands .......................... 219/92 |

Primary Examiner—B. A. Reynolds
Assistant Examiner—D. A. Tone
Attorney, Agent, or Firm—William Freedman; John P. McMahon

[57] ABSTRACT

A sound, low resistance joint is provided between two electrically conductive members, at least one having a bonded insulation coating thereon. In one form of the method of the present invention, a continuous metallic penetrator having sharp edges or burrs, such as a brass screen, is interwoven about at least two bonded insulation coated conductive members. The coated conductive members and interwoven penetrator are placed in a conductive connector member having chamfered holes therein. Welding electrodes subject the connector member to heat and pressure with welding current flowing between the welding electrodes. At least some of the welding current flows through the continuous metallic penetrator before the penetrator makes electrical contact to the insulation coated conductive members. The penetrator becomes heated by thermal heat from the welding electroides and resistance heat as the welding current passes therethrough. Heat from the interwoven penetrator melts the bonded insulation from the surface of the coated conductive members, causing the insulation to vaporize. A metallurgical bond is formed between the conductive members, the connector member, and the interwoven penetrator. Excess metal from the conductive members and the metallic penetrator flows through the chamfered holes, forming rivets. Other embodiments are disclosed.

12 Claims, 7 Drawing Figures

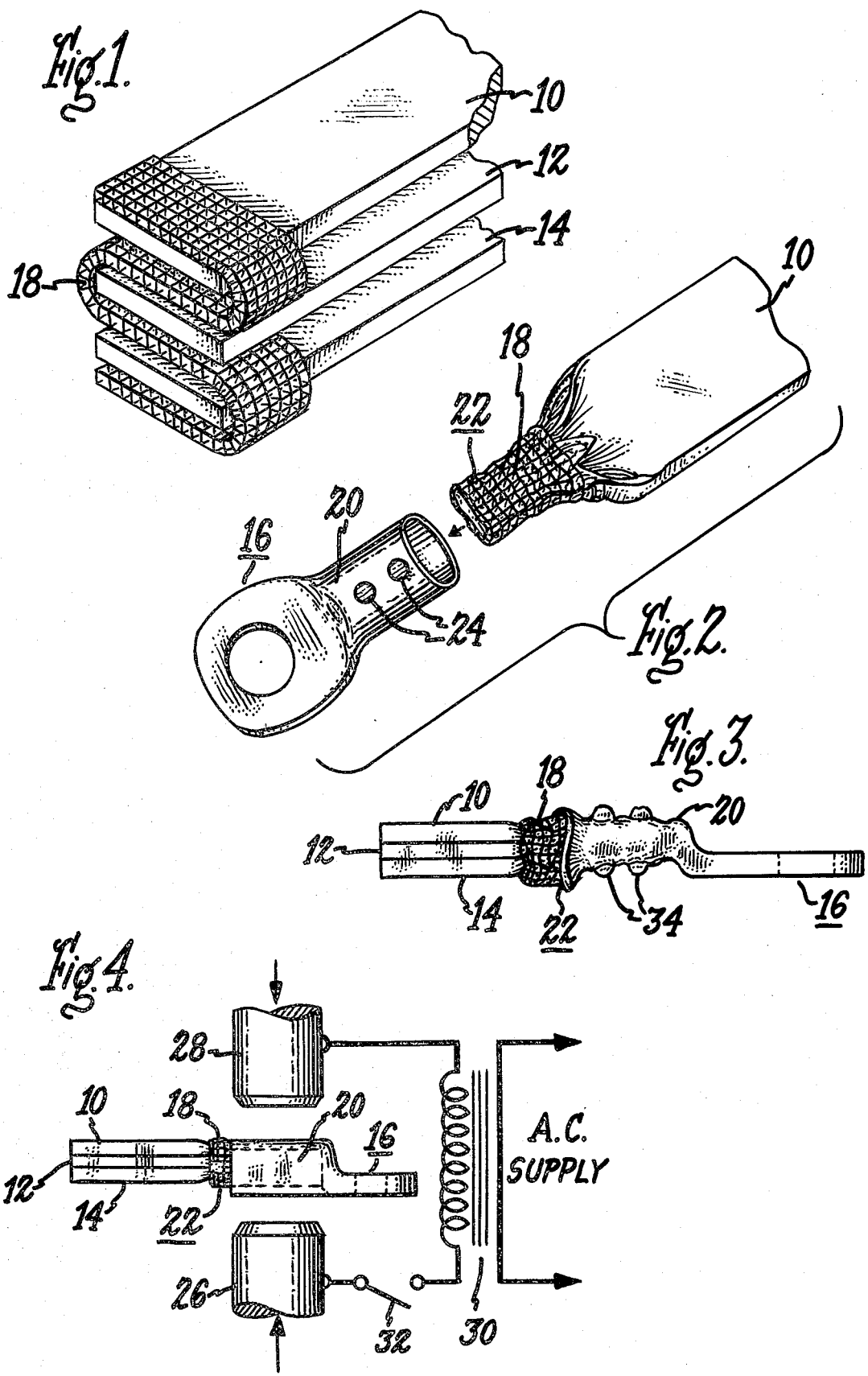

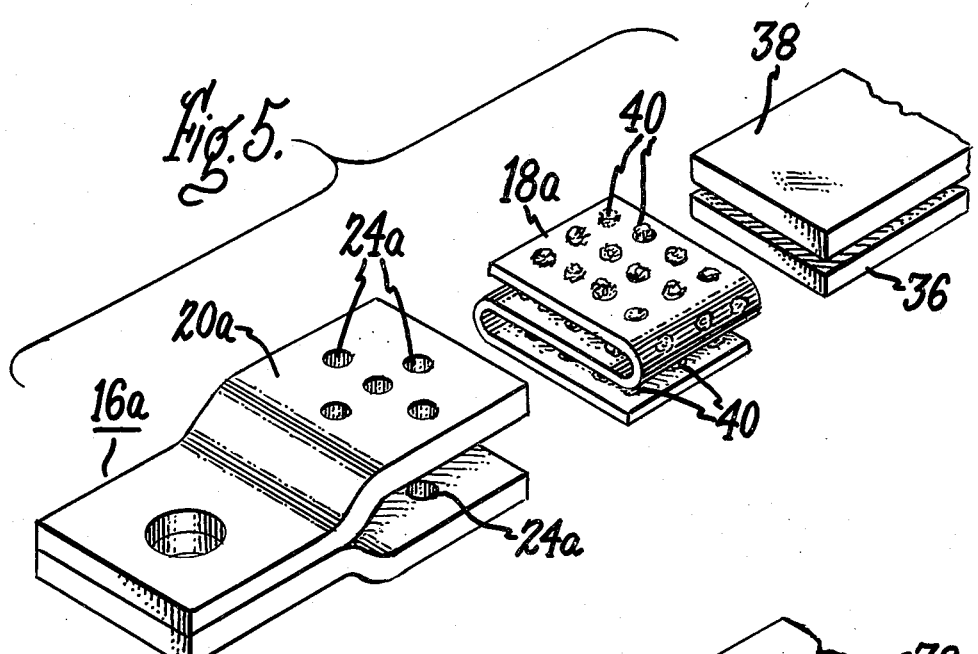
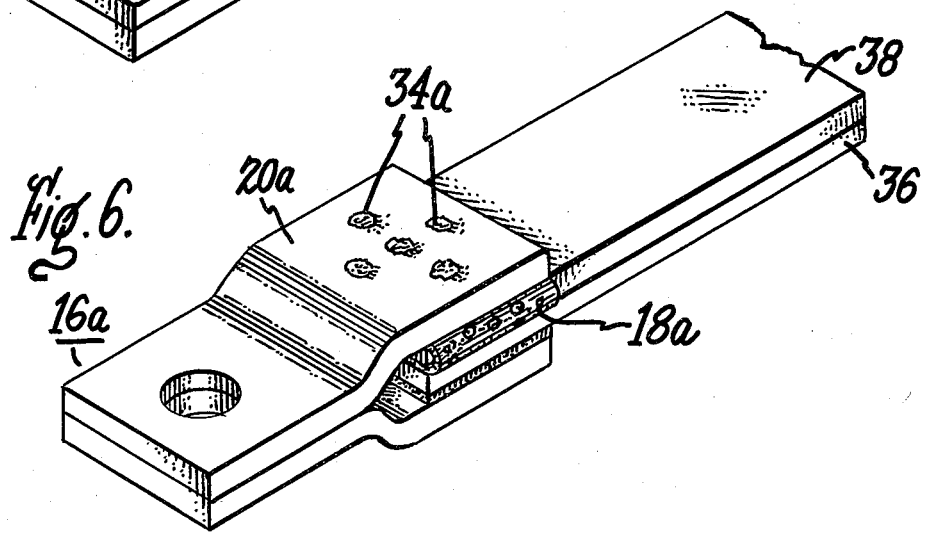
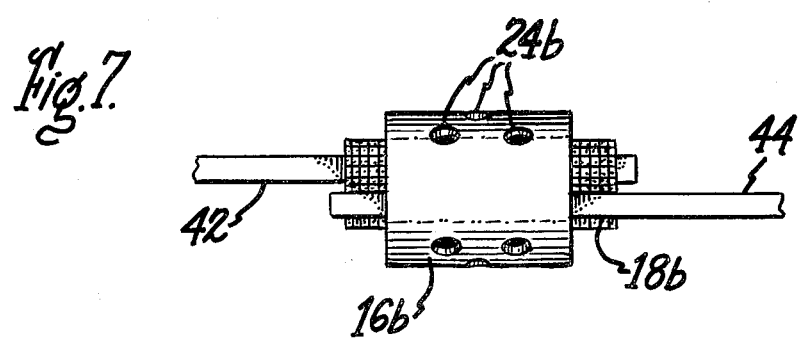

LOW RESISTANCE ELECTRIC JOINT BETWEEN CONDUCTIVE MEMBERS, AT LEAST ONE MEMBER HAVING AN INSULATION COATING THEREON, AND THE METHOD OF MAKING SUCH JOINT

This application is a continuation of application Ser. No. 942,853 filed Sept. 15, 1978 now abandoned which in turn is a continuation-in-part of application Ser. No. 720,637 filed Sept. 7, 1976 now abandoned.

BACKGROUND OF THE INVENTION

This invention relates to joints between electrically conducting members and, more particularly, to an electrical and mechanical joint between such members, wherein at least one member is an electrical conductor having a bonded insulation coating thereon, and also to the method of making such joint.

In electrical apparatus, such as transformers and the like, the coils are wound of insulation coated conductors formed of wire or strip material, which may be copper or aluminum. It is often required to make electrical connections between the insulation coated conductors or between such conductors and a conductive connector member. In such connection, it is usually required that the insulation coating be removed to provide a clean, metallic surface to ensure a strong, low resistance electric joint. However, in many such coated conductors, the insulation is an "enamel" insulation, which is bonded to the conductor. See, for example, the bonded "enamel" insulation disclosed in U.S. Pat. No. 3,291,639. Such bonded insulation can not be readily cut or stripped from the wire. The current method of removing such insulation is by scrapping, brushing, chemical, thermal, or some combination of such methods. All such methods are time consuming, and result in additional expense in manufacturing operations. It is readily apparent that there is a definite need in the electrical manufacturing field for a method of providing strong, low resistance joints between such enamel coated conductors and connectors, without removing such bonded insulation.

It is, therefore, one object of this invention to provide a novel method of joining bonded insulated conductors without removing such insulation.

It is a further object of this invention to provide a novel method of joining a bonded insulated conductor with a connector member without removing the insulation from the conductor.

It is a further object of this invention to provide a novel joint between insulated conductors or between an insulated conductor and a connector member.

SUMMARY OF THE INVENTION

In carrying out one form of our invention, we provide a method of joining at least two electrically conductive members which include bonded insulation thereon. The method includes interweaving a continuous conductor member about the insulated ends of the insulated conductive members. The insulated conductive members and the interwoven continuous conductor member are placed into a conductive connector member with the continuous conductor member engaging the mating surfaces of the conductive members and the surfaces of the conductive members which mate with the connector member. The connector member is subjected to welding heat and pressure by welding electrodes with welding current flowing between the electrodes. At least some of the welding current flows through the continuous conductor member before the continuous conductor member makes electrical contact with the conductive members wherein the bonded insulation is burned away and portions of the continuous conductor member, the conductive members, and the connector member melt to form a metallurgical bond.

The invention which is sought to be protected will be particularly pointed out and distinctly claimed in the claims appended hereto. However, it is believed that this invention and the manner in which its various objects and advantages are obtained, as well as other objects and advantages thereof, will be better understood by reference to the following detailed description of the preferred embodiment, particularly when considered in the light of the accompanying drawings.

BRIEF DESCRIPTION OF DRAWINGS

FIG. 1 is a perspective view of insulation coated electrical conductors showing one step in the method of this invention;

FIG. 2 is a perspective, exploded view showing the conductors of FIG. 1 formed to fit one form of connector, according to this invention;

FIG. 3 is a side view of one form of joint formed according to the steps of FIGS. 1 and 2;

FIG. 4 is a plan view showing the welding of the joint of FIG. 3;

FIG. 5 is a perspective exploded view of a method of forming another joint according to this invention;

FIG. 6 is a perspective view of the joint formed according to FIG. 5; and

FIG. 7 is a perspective view of a method of joining two coated conductors according to this invention

DESCRIPTION OF PREFERRED EMBODIMENT

Referring first to FIGS. 1 and 2, there is shown particularly in FIG. 1 a perspective view of a portion of a plurality of insulation coated conductive members 10, 12 and 14, in stripped form, which may be aluminum or copper, and which are provided with a bonded insulation coating, such as that disclosed in aforesaid U.S. Pat. No. 3,291,639. In order to join the conductive members 10, 12 and 14 to a conductive connector member 16 (see FIG. 2) a continuous metallic penetrator 18 is utilized. In FIG. 1, metallic penetrator 18 is in the form of a 50 mesh brass screen having a preferred composition of approximately 90% copper and 10% zinc, with a wire diameter of 0.0075 inches. As will be understood, in one form of the present invention, the brass screen provides a plurality of sharp edges for use as a metallic penetrator of the coated conductive members 10, 12 and 14. As shown in FIG. 1, the continuous metallic penetrator 18 is wrapped about, i.e., interwoven, conductive members 10, 12 and 14 such that it overlays the top surface of conductive member 10, is sandwiched between the mating surfaces of conductive members 10 and 12 and 12 and 14, and underlays the bottom surface of conductive member 14.

When used with a connector 16, having a tubular portion 20, the ends of conductive members 10, 12 and 14 are formed in a tubular shape 22, as shown in FIG. 2. Also, as shown in FIG. 2, in a preferred embodiment of this invention, tubular portion 20 of connector 16, is provided with a plurality of chamfered holes 24, drilled or otherwise formed in portion 20. Holes 24 are formed with a chamfer having the smaller diameter of holes 24 on the inside wall of tubular portion 20.

As will be understood, end 22 of conductive members 10, 12 and 14 is inserted into tubular portion 20 of connector 16, as indicated particularly in FIG. 4. Tubular portion 20 is subjected to welding pressure by welding electrodes 26 and 28 of a resistance welding machine, which deforms tubular portion 20, applying pressure to end 22. This pressure forces the sharp edges of the metallic penetrator 18 (the brass screen) into (but not through) the bonded insulation of conductive members 10, 12 and 14. Thus, at this point, the metallic penetrator 18 is not in electrical contact with the conductive members 10, 12, 14. The electrodes 26 and 28 are connected to transformer 30, and when switch 32 is closed, welding current flows between electrodes 26 and 28. Initially, the welding current passes between the welding electrodes 26, 28 with the current paths being the interwoven penetrator 18 (see FIG. 1) and the connector member 16. At least some of the welding current flows through the interwoven penetrator before the penetrator makes electrical contact with the conductive members 10, 12, 14. The penetrator 18 becomes heated by the thermal heat from the welding electrodes 26, 28 and from the resistance heat as the welding current passes therethrough. Heat from the interwoven penetrator 18 melts the bonded insulation from the surface of the conductive members 10, 12, 14, causing the insulation to vaporize. At this point, current flows through the entire structure, including previously insulated conductive members 10, 12, 14. Portions of the metallic penetrator 18 and conductive members 10, 12 and 14 melt, forming a metallurgical bond between the engaging surfaces of the various conductive members 10, 12 and 14 and the tubular portion 20 of connector member 16. Excess metal from conductive members 10, 12 and 14 and the metallic penetrator 18 flows through the chamfered holes 24 forming rivets 34, as indicated in FIG. 3, which is a side view of the completed joint.

Referring to the preceding paragraph, it is to be appreciated that it is not necessary that the switch 32 be closed after the tubular portion 20 is subjected to the welding pressure of welding electrodes 26 and 28. For example, in one embodiment, the switch 32 could be closed simultaneously with the application of welding pressure. In such an embodiment, at least some of the welding current would flow through the interwoven penetrator 18 before the penetrator makes electrical contact with the conductive members 10, 12, 14.

As will be understood, the joint, as in FIG. 3, can be formed from any number of coated conductive members 10, 12, 14. The connector member 16 may be of either aluminum or copper, or high conductivity alloys of aluminum or copper, as desired. The metallic penetrator 18 must be of a metallic material which is metallurgically compatible with both the conductive member (10, 12, 14) material and the connector member (16) material. Metallurgically compatible materials include those metals having about the same electrical conductivity and about the same melting point as the conductive member (10, 12, 14) material and the connector member (16) material. Where screen is used for the metallic penetrator 18, a brass composition of 80% copper and 20% zinc, or 90% copper and 10% zinc, with a 30 to 70 mesh is satisfactory. The wire diameter of the screen can vary from 0.006 to 0.090 inches. The pressure and electrical current of the resistance welder will vary according to the material of the conductive members (10, 12, 14) and the connector member (16). U.S. Pat. No. 3,566,008 in the name of the present inventors and assigned to the same assignee of this application, provides examples of various pressures and currents that may be used in specific examples. The disclosure of the patent is incorporated herein be reference.

FIGS. 5 and 6 show an example of another form of joint according to this invention. As there shown, insulation coated conductive members 36 and 38 are provided with a continuous metallic penetrator 18a in the form of a strip of copper alloy having a plurality of burrs 40 formed on opposite surfaces. As indicated, metallic penetrator 18a is wrapped i.e., interwoven about conductive members 36 and 38, so as to engage the lower surface of conductive member 36, the mating surfaces of conductive members 36 and 38 and the upper surface of conductive member 38. A connector member 16a has a U-shaped connector portion 20a with chamfered holes 24a formed therein. The ends of conductive members 36 and 38 with the wrapped metallic penetrator 18a are inserted into the U-shaped connector portion 20a. After welding pressure and heat are applied, the joint shown in FIG. 6 is formed. As explained earlier, the pressure forces the burrs 40 into (but not through) the insulation on conductive members 36 and 38. The welding current passes through the penetrator 18a and heats the conductive members 36,38, burning the insulation, and forming a metallurgical bond between the engaging surfaces of conductive members 36 and 38 and connector portion 20a of connector member 16a. In FIG. 6, rivets 34a can be seen in connecting portion 20a.

FIG. 7 shows the method of this invention used to join two insulated conductive members 42 and 44, shown as strip conductors. A continuous metallic penetrator 18b in the form of a brass screen is shown wrapped about, i.e., interwoven, conductive members 42, 44 so as to engage lower surface of conductive member 44, the mating surfaces between conductive members 42, 44 and the upper surface of conductive member 42, in a similar manner as previously described with reference to FIG. 5. A conductive member 16b, such as a copper or aluminum sleeve, having chamfered holes 24b surrounds the overlapped surfaces of conductors 42 and 44, as shown. Pressure and heat is then applied to connective member 16b, as previously described, melting the insulation coated on conductive members 42, 44 and forming a strong, low resistance joint between conductive members 42, 44.

In a test run to determine the utility of the joining method of this invention, two samples were made using enamel coated aluminum strips and a metallic penetrator in the form of a brass screen, and two samples using bare aluminum strip (aluminum having naturally appearing oxide coating) without the metallic penetrator. All samples used six strips of aluminum, 1.50 inches wide, 0.024 inches thick and 10.5 inches long. The opposite ends of each sample were formed as in 22 in FIG. 2 and inserted into a connector member, such as 16 in FIG. 2. All the connections were made with pressure and current as described in the aforesaid U.S. Pat. No. 3,566,008. In sample A, a 90% copper, 10% zinc screen was wrapped about each end of the strips as described herein. In sample D, an 80% copper, 20% zinc screen was wrapped about each end of the strips as herein described. Initial resistance measurements were made on all samples between the connector members. Thus, each resistance measurement included two joints, one at each terminal. Each sample was then subjected to a current of 5000 amperes, approximately fifty times normal current, for two seconds. The test was repeated fifty times for each smaple. After each two-seconds test, the sample was immersed in room temperature water to simulate thermal shock. After the last test, the resistance of each sample was measured in the same location as the first measurement. The following table shows the initial and final resistance of each sample in micro ohms.

TABLE I

| Sample | | Initial Resistance | Final Resistance |
|---|---|---|---|
| A | (Metallic Penetrator bonded insulation) | 54.2 | 67.0 |
| B | (No Metallic Penetrator No bonded insulation) | 56.3 | 63.4 |
| C | | 65.7 | 66.7 |
| D | (Metallic Penetrator bonded insulation) | 62.5 | 65.5 |

The above Table shows clearly that the method of this invention forms a low resistance connection between insulation coated conductive members and a connector member without removing the insulation of the conductive members. As indicated in the Table, the joints with the insulation coated conductive members show a resistance which is very similar to the resistance of the joints which are formed with bare conductive members having no insulation coating thereon.

GENERAL CONSIDERATIONS

The method and joint of the present invention are particularly useful in the transformer industry. For example, in the transformer industry, copper or aluminum wire or strips are often coated with polyvinyl enamel film insulation having a dielectric strenghth of approximately 1500 volts per mil. By comparison, such an enamel film has an insulation value of approximately fifteen (15) times that of the natural oxide appearing on aluminum. This enamel is generally difficult to remove but lends itself readily to removal through the method of the present invention.

Although the present invention has been illustrated for applications in which a plurality of insulation coated conductive members are joined together through the use of a continuous interwoven metallic penetrator, variations are available. For example, one such variation may comprise a method or joint in which a single insulation coated conductive member is joined to a conductive connector member. More particularly, instead to the three insulation coated conductive members 10, 12, 14 of FIG. 2, one such coated conductive member, e.g., conductive member 10 may be employed. In such a case, a continuous metallic penetrator 18 would be wrapped about the conductive member 10 to provide a path for the welding current, as previously described. In such an application, it is preferable that the single coated conductive member 10 be completely wrapped by the continuous metallic penetrator 18.

Further, the method or joint of the present invention may include a combination of insulation coated conductive member(s) and non-insulation coated conductive member(s). For example, referring to FIG. 1, the method may be employed in an application where conductive members 12, 14 are insulation coated, but conductive member 10 is not. In such an application, it is not essential that the continuous interwoven penetrator 18 be present about the top surface of conductive member 10 since non-insulation coated conductive member 10 will carry welding current therethrough when placed in the conductive connector member 16.

Also, it is to be appreciated that although it is preferable to employ a continuous metallic penetrator having sharp edges or burrs, the invention can be practiced through the use of a relatively smooth continuous conductor member wrapped about i.e., interwoven about, the insulation coated conductive members as previously described. In such an embodiment, the continuous conductor member should be of a thickness such that when the welding current passes therethrough, sufficient heat is generated to remove the insulation. A smooth continuous interwoven conductor member is somewhat less desirable than the previously described sharp edged penetrators since the sharp edges assist in the removal of the insulation.

While there has been shown and described the present preferred embodiment of this invention, it will be understood to those skilled in the art that various modifications may be made herein. All such modifications are considered included as fall within the true spirit and scope of the invention as set forth in the appended claims.

What is claimed as new and which it is desired to secure by Letters Patent of the United States is:

1. A method of joining at least two electrically conductive members which include bonded insulation thereon, comprising the steps of:
    (a) interweaving a continuous conductor member about the insulated ends of said insulated conductive members;
    (b) placing said insulated conductive members and said interwoven continuous conductor member into a highly conductive connector member with said continuous conductor member engaging the mating insulated surfaces of said insulated conductive members and the insulated surfaces of said insulated conductive members which mate with said highly conductive connector member, and
    (c) subjecting said connector member to welding heat and pressure by welding electrodes with welding current flowing between said electrodes and spread across said interwoven conductor member, at least some of said welding current flowing through said continuous conductor member melting some of said bonded insulation before said continuous conductor member makes electrical contact with said conductive members wherein said bonded insulation is burned away and portions of said continuous conductor member, said conductive members, and said highly conductive connector member melt to form a metallurgical bond.

2. A method in accordance with claim 1 in which said continuous conductor member comprises a metallic penetrator having a plurality of sharp edges or burrs.

3. A method in accordance with claim 2 in which said metallic penetrator comprises a brass screen.

4. A method in accordance with claim 2 in which said metallic penetrator comprises a copper alloy sheet.

5. A method in accordance with claim 2 in which said metallic penetrator is of a material having about the same electrical conductivity and melting point as said conductive members and said connector member.

6. A method in accordance with claim 2 in which said bonded insulation comprises bonded enamel.

7. A method in accordance with claim 2 in which said conductive members comprise aluminum, said insulation coating comprises bonded enamel, said metallic penetrator comprises brass, and said connector member is selected from the group consisting of copper, aluminum, or high conductivity alloys of copper or aluminum.

8. A method of joining an electrical conductive member which includes bonded insulation thereon to a highly conductive connector member, comprising the steps of:

(a) wrapping a continuous conductor member about the insulated end of said insulated conductive member, (b) placing said insulated conductive member and said continuous conductor member into said highly conductive connector member, and (c) subjecting said highly conductive connector member to welding heat and pressure by welding electrodes with welding current flowing between said electrodes and spread across said wrapped conductor member, at least some of said welding current flowing through said continuous conductor member melting some of said bonded insulation before said continuous conductor member makes electrical contact with said conductive member wherein said bonded insulation is burned away and portions of said continuous conductor member, said conductive member, and said highly conductive connector member melt to form a metallurgical bond.

9. A method in accordance with claim 8 in which said continuous conductor member comprises a metallic penetrator having a plurality of sharp edges or burrs.

10. A method of joining at least two electrically conductive members at least one of which includes bonded insulation thereon, and at least one of which does not include bonded insulation thereon, comprising the steps of:

(a) wrapping a continuous conductor member about the insulated end of said insulated conductive member;

(b) placing said insulated conductive member, said non-insulated conductive member, and said wrapped continuous conductor member into a highly conductive connector member with said continuous conductor member engaging the mating surface between said insulated and non-insulated conductive members and the surfaces of said insulated conductive member which mate with said highly conductive connector member, and;

(c) subjecting said highly conductive connector member to welding heat and pressure by welding electrodes with welding current flowing between said electrodes and spread across said wrapped conductor member, at least some of said welding current flowing through said continuous conductor member melting some of said bonded insulation before said continuous conductor member makes electrical contact with said insulated conductive member wherein said bonded insulation is burned away and portions of said continuous conductor member, said insulated and non-insulated conductive member, and said highly conductive connector member melt to form a metallurgical bond.

11. A method in accordance with claim 10 in which said continuous conductor member comprises a metallic penetrator having a plurality of sharp edges or burrs.

12. A method in accordance with claim 11 in which said metallic penetrator comprises a brass screen.

* * * * *